United States Patent
Wells

(10) Patent No.: US 7,744,321 B2
(45) Date of Patent: Jun. 29, 2010

(54) INSULATED FASTENER

(75) Inventor: Stephen Wells, Flowery Branch, GA (US)

(73) Assignee: ARRIS Group, Inc., Suwanee, GA (US)

( * ) Notice: Subject to any disclaimer, the term of this patent is extended or adjusted under 35 U.S.C. 154(b) by 529 days.

(21) Appl. No.: 11/706,816

(22) Filed: Feb. 13, 2007

(65) Prior Publication Data
US 2007/0189877 A1 Aug. 16, 2007

Related U.S. Application Data

(60) Provisional application No. 60/772,708, filed on Feb. 13, 2006.

(51) Int. Cl.
*F16B 35/06* (2006.01)
(52) U.S. Cl. .................. 411/377; 411/410; 411/903
(58) Field of Classification Search .............. 411/410, 411/377, 373, 402, 403, 903
See application file for complete search history.

(56) References Cited

U.S. PATENT DOCUMENTS

| | | | | |
|---|---|---|---|---|
| 3,134,290 A | * | 5/1964 | Jentoft | 411/377 |
| 3,592,100 A | * | 7/1971 | Mackiewicz et al. | 411/403 |
| 3,693,495 A | * | 9/1972 | Wagner | 411/377 |
| 3,885,492 A | * | 5/1975 | Gutshall | 411/373 |
| 3,897,712 A | * | 8/1975 | Black | 411/373 |
| 4,041,834 A | * | 8/1977 | Herkes et al. | 411/82.2 |
| 4,373,842 A | * | 2/1983 | Bettini et al. | 411/377 |
| 4,452,556 A | * | 6/1984 | Nelson et al. | 411/377 |
| 4,948,318 A | * | 8/1990 | Nottelmann et al. | 411/377 |
| 5,122,021 A | | 6/1992 | Medal | |
| 5,358,368 A | * | 10/1994 | Conlan et al. | 411/410 |
| 5,906,463 A | * | 5/1999 | Damm et al. | 411/369 |
| 6,302,630 B1 | * | 10/2001 | Grant | 411/372.6 |

* cited by examiner

*Primary Examiner*—Flemming Saether
(74) *Attorney, Agent, or Firm*—Troy A. Van Aacken; Robert J. Starr

(57) ABSTRACT

A metallic head of a fastener includes merlon portions between crenel portions. The crenel portions form a slot which may be used to tighten or loosen the fastener. An insulating material covers portions of the metallic head to prevent human contact with the metallic head and terminal lugs secured thereby. The metallic head defines a counter bore portion. Inner walls of the counter bore portion may be formed into a hexagon. The insulating material may extend into the counter bore portion covering the inner walls, as well as the surfaces of the crenel portions. The bottom of the counter bore may remain uncovered to facilitate signal testing with a test probe.

6 Claims, 2 Drawing Sheets

INSULATED FASTENER

CROSS REFERENCE TO RELATED APPLICATION

This application priority under 35 U.S.C. 119(e) to U.S. provisional patent application No. 60/772,708 entitled "NID SCREW," which was filed Feb. 13, 2006, and is incorporated herein by reference in its entirety.

FIELD OF THE INVENTION

The present invention relates generally to fasteners for terminating electrical conductors.

BACKGROUND

Electrical devices are often connected to other devices via one or more conductors, which are typically wire conductors. For example, wires carrying household electrical current are terminated at a fuse panel or breaker panel located in a basement or other remote location. These panels often require tools to open and may include a means for locking the panel to prevent unauthorized personnel, like children, from entering the panel where high voltages are terminated.

Another example is communication device that provides an interface between a home or office building and a service provider's communication network. The communication network may include a cable network, such as a community television antenna ("CATV"), which may also be used for transporting video, data, voice and other types of information signals. The communication network may also include a telephony network that may comprise plain old telephony service ("POTS") equipment, or digital subscriber line ("DSL") equipment. These various types of communication networks typically interface with a user's home or office building at an outdoor interface device.

A network interface device ("NID") interfaces the service provider's communication with the user's internal home or office wiring. The communication signals typically carried across the interface are low voltage signals that do not pose a safety hazard from personnel contact with an electrical termination at the interface.

However, the same conductors that carry the communication signals may also carry higher voltages. For example in a telephony communication network, a voltage signal is impressed in the same wires that carry a communication signal to cause a telephone being dialed to ring. This is typically referred to as the ringing voltage and is typically ninety volts DC in United States. In a cable system that provides telephony, the NID provides voice signals to a line interface card that couples to the home's or office's internal telephone system wiring. The wiring from the line interface card to the telephony wiring also carries ringing voltage.

Since the housing that encloses the NID equipment is typically plastic and located outside of a house, curious children may open the housing doors to see what is inside. Adults may also open the housing trying to correct an operational problem with their television, telephone or data service.

Conductors that carry ringing voltage typically terminate with a lug such as a ring tongue lug or a spade lug. Installation personnel then connect the lugs to terminal strips using terminal screws. To prevent inadvertent human contact with the head of terminal screws, which could be dangerous if a ringing voltage was impressed on the conductors at the same time as contact, screws with insulated heads are used.

An example of an insulated screw fastener is found in U.S. Pat. No. 5,122,021 to Medal, entitled Encapsulated Fastener and Washer ("'021"). In the '021 patent, a screw with a slotted round head is covered with a plastic cover that provides access to the screw slot. A hexagonal shape is molded into the plastic cover to facilitate the use of a wrench or nut driver in tightening the screw. The plastic cover edges extend slightly above the top of the screw head to block a finger from contacting the otherwise exposed screw head. Thus, the flat screw top is slightly recessed into the plastic cover.

Although the arrangement described in the '021 patent provides some protection from contact with the screw head, a determined child with small, fleshy finger tips could press the screw end and contact the metallic flat screw head surface. Thus, there is a need in the art for a terminal fastener that further reduces the possibility that contact with the metallic fastener can occur, either inadvertently or deliberately.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. This disclosure is not intended nor is to be construed to limit the present invention or otherwise to exclude other embodiments, adaptations, variations, modifications and equivalent arrangements, the present invention being limited only by the claims appended hereto and the equivalents thereof.

Figure 1A:
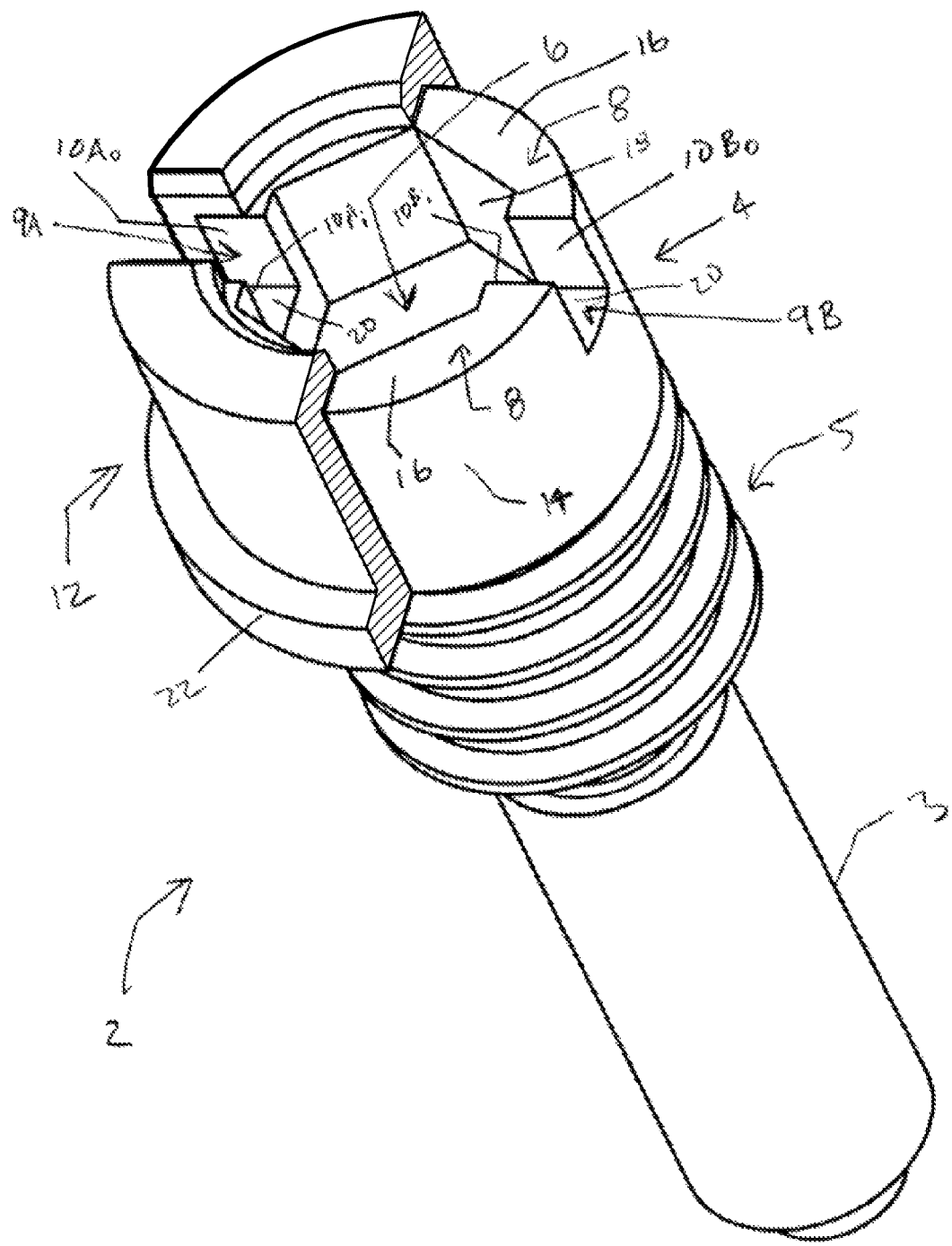
FIG. 1 illustrates an insulated fastener with partially cut away insulator material.
Figure 1B:
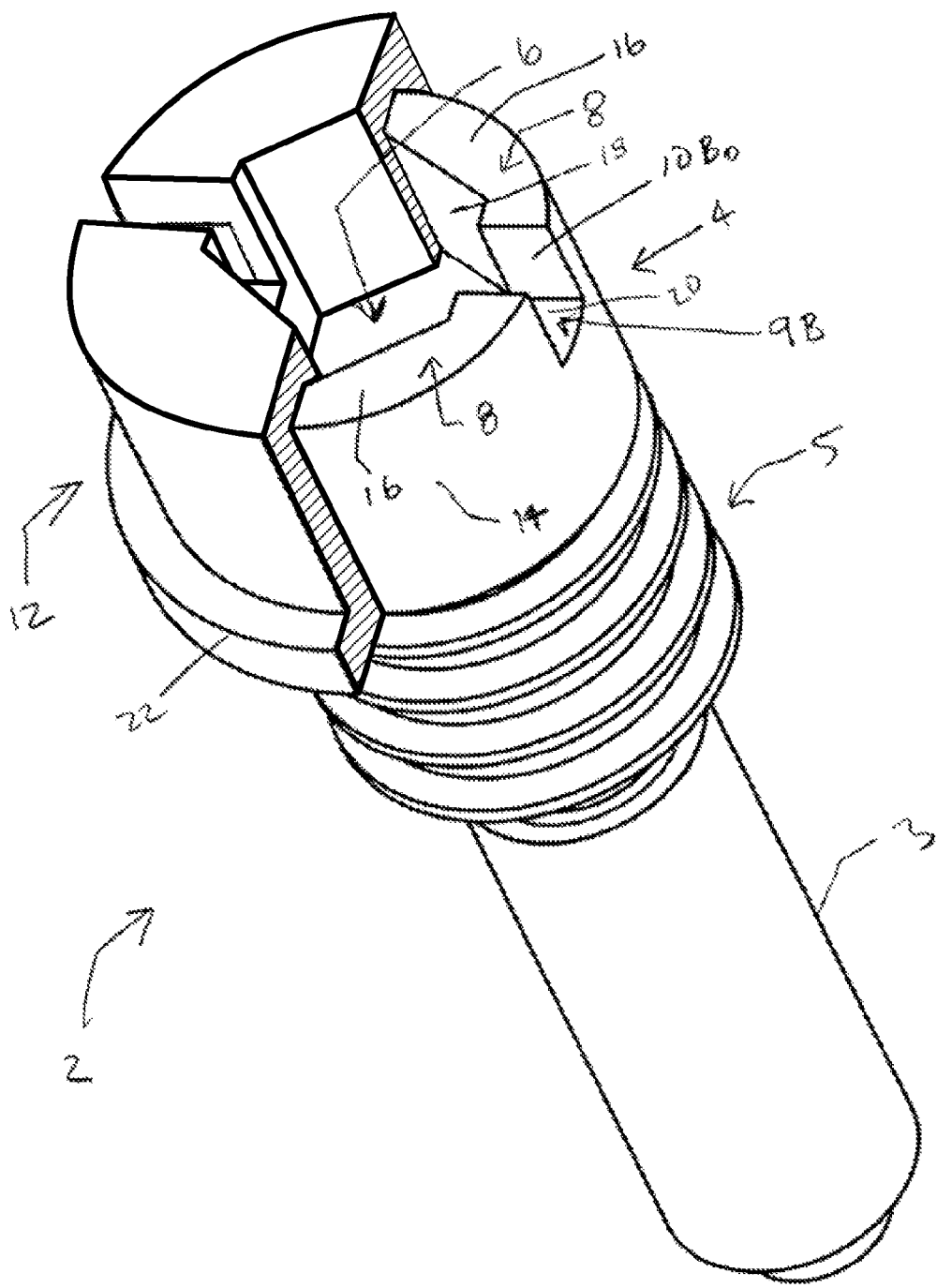

Turning now to FIG. 1, an insulated fastener 2 is shown. A shank portion, which may include screw threads, for example, and a metallic head 4 compose fastener 2. Metallic washers 5 may be included between the metallic head portion 4 and the shank portion 3. The metallic head portion 4 defines a counter bore portion 6. The counter bore portion may be further defined by merlon portions 8. In an embodiment where merlon portions 8 define counter bore portion 6, the merlon portions define crenel portions 9. Crenel portions 9 further include end faces 10. Thus, crenel 9A and opposing crenel 9B cooperate to form a slot. A flat blade screwdriver tool, for example, can be used to turn fastener 2 shown in FIG. 1 by inserting the blade into the slot formed by crenel portions 9A and 9B. Assuming right hand threads, the blade bears against faces $10A_o$ and $10B_i$ when tightening fastener 2, where faces 10A and 10B correspond to crenel portions 9A and 9B, respectively, and the subscripts $_i$ and $_o$ correspond to faces facing into and out of the page, respectively, as viewed in the figure.

Insulating material 12 is shown covering metallic head 4 such that outer portion 14 and top portions 16 are insulated, but end faces 10 are not covered with insulating material. In addition, inner walls 18 are not covered by insulating material 12. It will be appreciated that in an alternative embodiment, inner walls 18 and end faces 10 may also be covered with insulating material 12. By covering the outer portions 14, inner portions 16, as well as the inner walls 18 and end faces 10, insulating material 12 provides protection from shock while still allowing a test probe to sample voltage signals from the metallic portion of head 4 that is located at the bottom of the counter bore portion 6. This embodiment is not shown in the figure. Further, it will be appreciated that insulating material 12 is shown in the figure as a cut-away illustration for clarity in showing the underlying portions of metallic head 4. However, in the preferred embodiment, insulating material 12 covers all of outer portion 14 and both top portions 16. In addition, insulating material 12 may cover the floors 20 of corresponding crenels 9. In another feature, insulating material 12 may include a guard base 22 formed into the insulating material. Guard base 22 is preferably larger in diameter than the outer diameter of washers 5 to prevent contact with the washers and terminal lugs that may be secured between them.

In an embodiment, inner walls 18 may form a shape, such as a polygon, as shown in FIG. 1. For example, the polygon may be a hexagon of a predetermined size for engaging with an allen head wrench tool when tightening or loosening fastener 2. Thus, the allen head tool may be used to tighten fastener 2 instead of a flat blade screwdriver. As discussed above, insulating material 12 may or may not cover inner walls 18. If inner walls 18 form a shape, insulating material 12 would preferably conform to the same shape. Thus, if the shape formed by inner walls 18 is a hexagon, for example, the insulator material would also form a hexagon for engaging with a tool such as an allen wrench.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A fastener comprising:
    a metallic head defining a counter bore portion and having opposing merlon portions; and
    insulator material that covers an outer portion, an inner wall and a top portion of each merlon portion, wherein the insulator material defines openings that expose end portions of each merlon portion.

2. The fastener of claim 1 wherein the insulator material is a rigid material.

3. The fastener of claim 1 wherein the inner walls of the merlon portions form a shape.

4. The fastener of claim 3 wherein the shape formed by the inner walls is a polygon.

5. The fastener of claim 3 wherein the insulator material that covers the inner walls of the merlon portions forms a shape that is substantially the same as the shape formed by the inner walls of the merlon portions.

6. The fastener of claim 1 wherein the insulator material that covers the inner walls of the merlon portions forms a shape.

* * * * *